United States Patent
Nakamura et al.

(10) Patent No.: US 9,162,355 B2
(45) Date of Patent: Oct. 20, 2015

(54) MOBILE ROBOT AND TRAVELLING METHOD FOR THE SAME

(75) Inventors: Ryosuke Nakamura, Hitachinaka (JP); Azusa Amino, Hitachinaka (JP)

(73) Assignee: HITACHI, LTD., Tokyo (JP)

( * ) Notice: Subject to any disclaimer, the term of this patent is extended or adjusted under 35 U.S.C. 154(b) by 882 days.

(21) Appl. No.: 12/958,575

(22) Filed: Dec. 2, 2010

(65) Prior Publication Data

US 2011/0137462 A1 Jun. 9, 2011

(30) Foreign Application Priority Data

Dec. 3, 2009 (JP) .................................. 2009-275717

(51) Int. Cl.
*B25J 5/00* (2006.01)
*G05D 1/02* (2006.01)

(52) U.S. Cl.
CPC ................. *B25J 5/007* (2013.01); *G05D 1/024* (2013.01); *G05D 1/0274* (2013.01); *Y02T 10/7258* (2013.01)

(58) Field of Classification Search
CPC ....... B25J 5/007; G05D 1/024; G05D 1/0274; Y02T 10/7258; A61G 5/046; A61G 5/06; A61G 5/1072; A61G 5/1075; A61G 2005/1051; A61G 2203/44; A61G 2203/36; A61G 2203/40; A61G 2203/42; B62D 61/12; B62D 55/075; Y10S 280/10; B60R 21/0134; B60R 21/0132; B60R 21/0136; B60R 2021/01272; B60T 7/12; B60T 7/22; B60T 2201/024; B60T 2201/022

See application file for complete search history.

(56) References Cited

U.S. PATENT DOCUMENTS

| | | | | |
|---|---|---|---|---|
| 4,265,326 A * | 5/1981 | Lauber | .......................... | 180/8.3 |
| 4,932,831 A * | 6/1990 | White et al. | ................... | 414/732 |
| 4,977,971 A * | 12/1990 | Crane et al. | ..................... | 180/8.3 |
| 5,372,211 A * | 12/1994 | Wilcox et al. | .................. | 180/8.2 |
| 6,267,196 B1 * | 7/2001 | Wilcox et al. | .................. | 180/347 |
| 6,845,830 B2 * | 1/2005 | Tojo et al. | ....................... | 180/8.3 |
| 7,426,970 B2 * | 9/2008 | Olsen | ........................... | 180/65.1 |
| 7,823,673 B2 * | 11/2010 | Asogawa | ....................... | 180/209 |
| 8,170,780 B2 * | 5/2012 | Field et al. | ..................... | 701/124 |
| 2006/0025888 A1 * | 2/2006 | Gutmann et al. | ............. | 700/245 |
| 2006/0097683 A1 * | 5/2006 | Hosoda et al. | ............ | 318/568.12 |
| 2007/0080001 A1 * | 4/2007 | Beck et al. | .................. | 180/24.07 |

(Continued)

FOREIGN PATENT DOCUMENTS

| | | |
|---|---|---|
| JP | 2007-45287 | 2/2007 |
| JP | 2007-168602 | 7/2007 |

(Continued)

OTHER PUBLICATIONS

Office Action in corresponding Japanese Patent Application No. 2009-275717, mailed May 7, 2013 with a partial English language translation thereof.

*Primary Examiner* — Bao Long T Nguyen
(74) *Attorney, Agent, or Firm* — Baker Botts L.L.P.

(57) ABSTRACT

This mobile unit suppresses lateral vibration produced when the mobile unit passes over a step. A stabilizer according to the present invention predicts contact timing at which the mobile unit makes contact with a step, which may be a bump or pit, using sensor information or map information, shifts the center of gravity of the mobile unit laterally by controlling actuators, and shifts the center of gravity laterally for the next step after detecting that the mobile unit has passed over the previous step.

6 Claims, 8 Drawing Sheets

(56) References Cited

U.S. PATENT DOCUMENTS

| | | | |
|---|---|---|---|
| 2008/0179115 A1* | 7/2008 | Ohm et al. | 180/9.21 |
| 2008/0183332 A1* | 7/2008 | Ohm et al. | 700/250 |
| 2008/0223630 A1* | 9/2008 | Couture et al. | 180/9.32 |
| 2009/0210114 A1* | 8/2009 | Baumann et al. | 701/45 |
| 2009/0314554 A1* | 12/2009 | Couture et al. | 180/8.7 |
| 2010/0139995 A1* | 6/2010 | Rudakevych | 180/9.32 |

FOREIGN PATENT DOCUMENTS

| | | |
|---|---|---|
| JP | 2009-035157 | 2/2009 |
| JP | 2009-055682 | 3/2009 |

* cited by examiner

FIG. 3A
SIDE VIEW
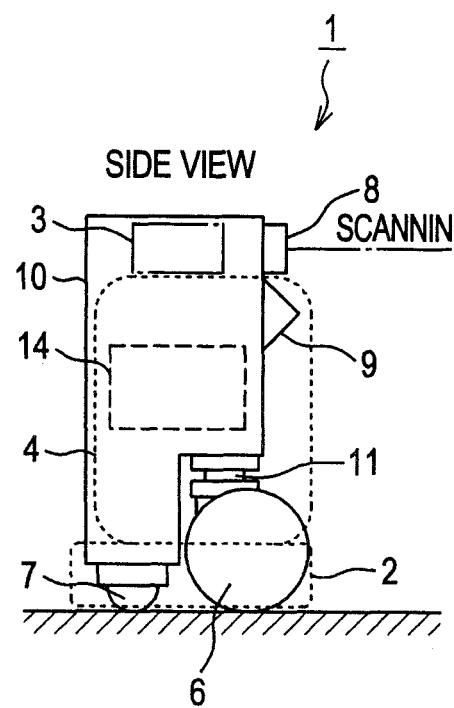
FIG. 3B
FRONT VIEW
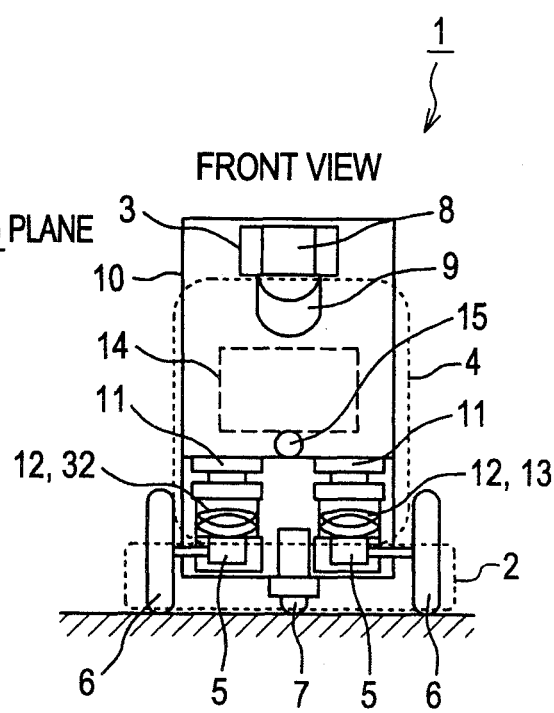
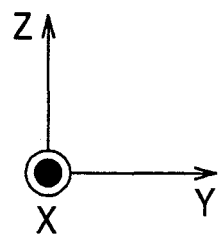
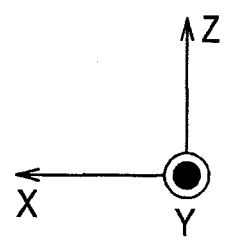

FIG. 10
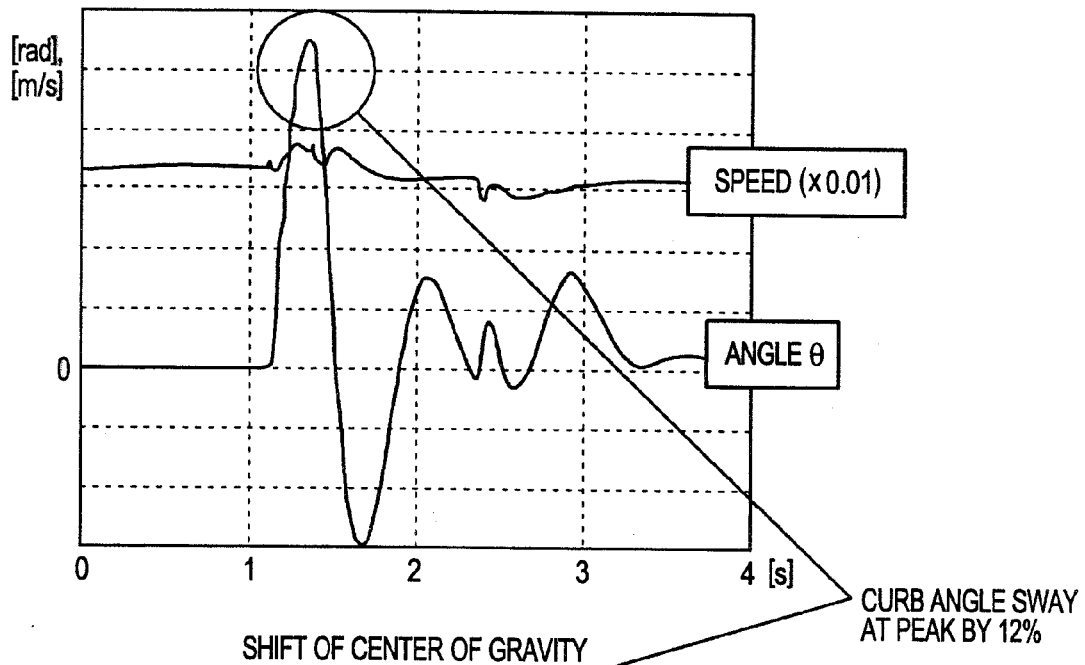
NO SHIFT OF CENTER OF GRAVITY
CURB ANGLE SWAY AT PEAK BY 12%
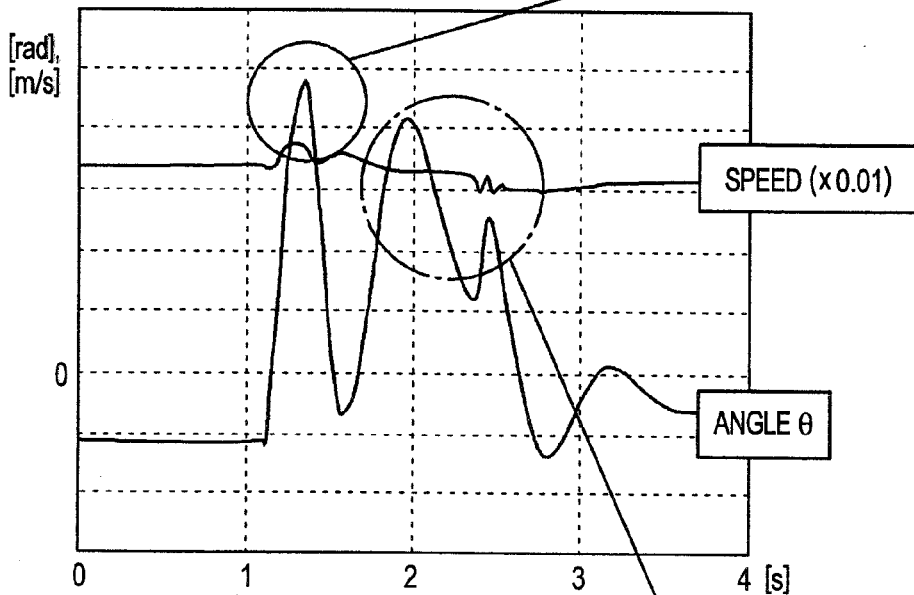
SHIFT OF CENTER OF GRAVITY
INFLUENCE OF UNSUPPORTED DOWNWARD STEP

MOBILE ROBOT AND TRAVELLING METHOD FOR THE SAME

BACKGROUND OF THE INVENTION (1) Field of the Invention

The present invention relates to a mobile robot with a stabilizer for preventing lateral vibration produced when the mobile robot passes over steps and a travelling method for stabilizing the mobile robot.

(2) Description of the Related Art

Conventionally, mobile robots that travel over steps on a road surface in various travel manners have been proposed (e.g., JP-A No. 2009-55682 and JP-A No. 2007-168602).

When there is a bump on a floor surface, an inverted mobile unit disclosed in JP-A No. 2009-55682 inclines itself forward while maintaining contact between its rotary unit and the bump to acquire the torque required to pass over the step through inversion control.

JP-A No. 2007-168602 discloses a two-wheel travelling carriage that detects steps. The carriage is configured not to change the travel direction when the detected step has a height equal to or less than 10% of the radius of the wheels of the carriage, but to travel over the step with both wheels making contact with the step when the detected step has a height from 10% to 40% of the radius of the wheels.

SUMMARY OF THE INVENTION

The related art focuses on production of torque required to pass over steps; however, toppling caused by lateral vibration produced when a mobile unit travels over the step and deviation of the travel direction derived from the lateral vibration are not considered.

Specifically, when a mobile unit, which has a high center of gravity and right and left wheels with a short distance therebetween, diagonally travels over a step, the mobile unit may topple due to impact from the step or may change the travel direction and deviate from a route due to lateral vibration.

For example, according to the technique in JP-A No. 2009-55682, when the mobile unit traveling so fast climbs up to a sidewalk or the like, the wheels make contact with the step one after another. In this case, the mobile unit inclines to move the center of gravity above the bump ahead of the wheels. The wheels in this state can obtain a torque required to easily climb over the step, but the mobile unit may topple over due to the lack of consideration of the impact produced by the contact between the step and wheels or may largely deviate from the route due to lateral vibration.

Even the technique in JP-A No. 2007-168602 may bring about toppling of the travelling carriage due to the lack of consideration of the impact produced by the contact between the step and wheels or significant deviation from the route due to lateral vibration.

Furthermore, when the mobile unit and travelling carriage in JP-A No. 2009-55682 and JP-A No. 2007-168602 move down a step, such as into a groove and pit, on a wheel-by-wheel basis, the mobile unit and travelling carriage may also topple due to the lack of consideration of the moment involving the drop of one of the wheels or may deviate from the route due to lateral vibration.

The present invention has been made in view of the above circumstances and provides a mobile robot capable of mitigating impact from steps to prevent the mobile robot from toppling over and from changing the travel direction and deviating from the route due to lateral vibration.

In a mobile robot including a plurality of wheels that are suspended by a main body of the mobile robot and travel on a floor surface, a drive mechanism that rotates the wheels, and a drive controller that controls the drive mechanism, the mobile robot includes actuators that are provided to adjust the distance between the mobile robot and the wheels, a suspension control unit that controls the actuators, a sensor that detects steps on the floor surface, and a step prediction unit that predicts the time at which the step makes contact with the wheels from the sensor and the speed of the mobile unit. The suspension control unit controls suspensions to shift the center of gravity in a direction in which impact produced by contact between a step on the floor surface and one of the wheels is mitigated.

In addition, when the mobile robot moves down to a pit with one wheel at a time, the suspension control unit shifts the center of gravity in a direction opposite to the other wheel that next moves down the pit in advance by controlling the actuators.

In addition, when a step detecting unit detecting the movement of the wheels over bumps and pits detects that the wheels have passed over a bump or pit, the suspension control unit shifts the center of gravity back to the center of the mobile robot.

In addition, the suspension control unit adjusts an amount of center of gravity shift of the mobile robot according to an interval of time, predicted by the step prediction unit, at which the right and left wheels make contact with a bump or pit.

Furthermore, a travelling method for a mobile robot including a step detecting sensor that detects steps includes the steps of detecting the direction to a step and the height of the step obtained by the step detecting sensor, measuring the distance between the step and the mobile robot, calculating contact timing at which the mobile robot makes contact with the step based on a target travelling speed, shifting the center of gravity to the side of a wheel that makes contact with the step first by controlling suspensions upon contact with the step, shifting the center of gravity to the side of the wheel that makes contact with the step first until the wheel passes over the step and then the other wheel makes contact with the step, and shifting the center of gravity back to the center of the mobile robot upon detection that both wheels have passed over the step.

In addition, the height of and direction to the step are obtained from map information.

According to the present invention, a mobile robot can be provided, which is capable of mitigating impact from steps to prevent the mobile robot from toppling over and from changing the travel direction and deviating from the route due to lateral vibration.

BRIEF DESCRIPTION OF THE DRAWINGS

Embodiments of the present invention will be described in detail based on the following figures, wherein:

FIGS. 3A and 3B are diagrams showing the mechanism of the mobile robot according to the embodiment of the invention;

FIG. 10 is a graph showing the effect of the embodiment of the invention.

DETAILED DESCRIPTION OF THE INVENTION

The inventors of the present invention have been developing mobile robots travelling in the outdoors, and, more specifically speaking, have performed a study aimed at developing personal EVs (Electric Vehicles). The envisioned EV is, for example, a tricycle-like EV that is longer in the travel direction, has two front wheels and one rear wheel and has a relatively high center of gravity.

Because such a mobile robot is expected to travel on roadways and sidewalks, development of the mobile robot needs to be done under the assumption that it will encounter a step between a roadway and a sidewalk. A possible accident occurring during travel is the toppling of the mobile robot at a step.

Figure 1:
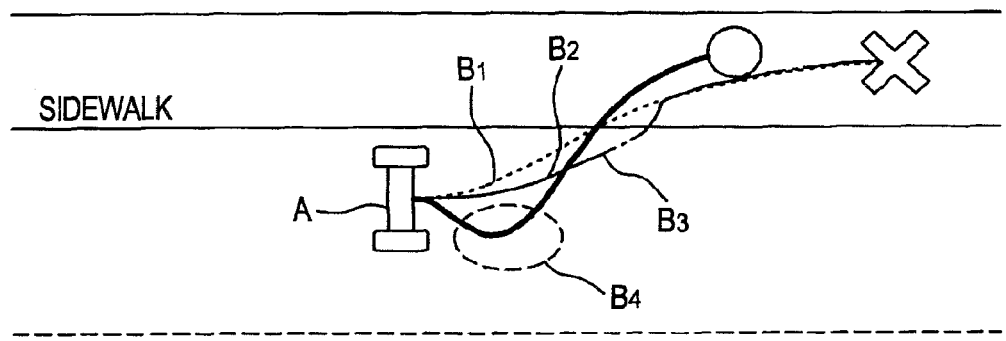
FIG. 1 depicts the motion of a mobile robot when it passes over a step.

The motion of the mobile robot passing over the step will be briefly described with FIG. 1.

FIG. 1 depicts the motion of the mobile robot passing over the step.

In FIG. 1, a mobile robot A tries to move up a step to a sidewalk through a route indicated by a dotted line B1, but cannot, because the mobile robot A does not have enough capability to pass over the step (x). In a route indicated by a dashed dotted line B2, a force from the step of the sidewalk produces a turning force in the mobile robot A, resulting in route deviation toward the turning direction while the mobile robot A is passing over the step (x).

On the other hand, the mobile robot A can pass over the step between the roadway and sidewalk, as indicated by a solid line B3, by negotiating the step at a large entrance angle (o). However, the mobile robot A needs to curve largely on the roadway side to form the large entrance angle, and then moves up to the sidewalk.

As indicated by the solid line B3 in FIG. 1, the mobile robot A that curves largely so as to go beyond the centerline of the roadway exposes itself to considerable safety risk. If the mobile robot is configured to negotiate the step at a small entrance angle rather than at a large entrance angle, the mobile robot developed with a relatively high center of gravity may sway in a lateral direction and topple over.

In order to solve the problem, the inventors of the present invention have contrived to mitigate the impact by shifting the center of gravity of the mobile robot according to the entrance angle, height of the step, and entering speed when the mobile robot moves up and down the step.

Embodiment 1

An embodiment of the present invention will be described by referring to FIG. 2.

Figure 2:
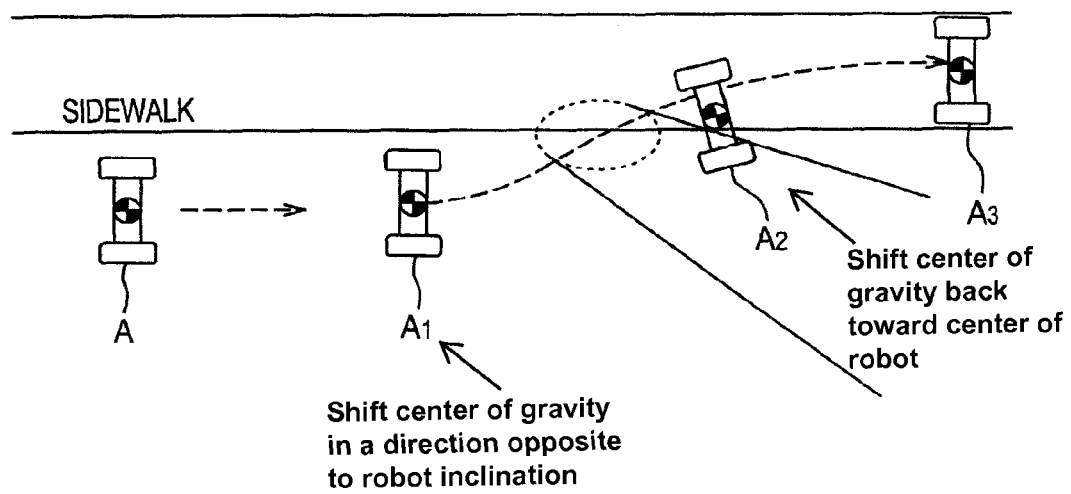
FIG. 2 depicts the motion of a mobile robot according to an embodiment of the present invention.

FIG. 2 provides a brief overview of the embodiment of the invention.

In FIG. 2, the mobile robot A travelling in the direction indicated by an arrow detects the entrance angle with respect to an approaching step of the sidewalk, the position and height of the step and entering speed in advance, and then shifts the center of gravity according to the position and height. The center of gravity is shifted opposite to the direction in which the mobile robot inclines when it climbs up the step.

Specifically, as shown in FIG. 2, the mobile robot A having the center of gravity at its center, namely being in a normal state, travels in the direction indicated by the arrow. Then, the mobile robot A1 that has detected the presence of the step shifts the center of gravity opposite to the direction in which the mobile robot A1 inclines to climb up the step. The mobile robot A2 on the step immediately shifts the center of gravity in the reverse direction and shifts the center of gravity back to the center of the mobile robot A2 after both wheels have climbed up the step.

The structure of the embodiment of the present invention will be described below by referring to drawings.

FIGS. 3A and 3B are schematic diagrams showing the mechanism of the mobile robot according to the embodiment of the invention: FIG. 3A is a side view; and FIG. 3B is a front view.

Figure 4:
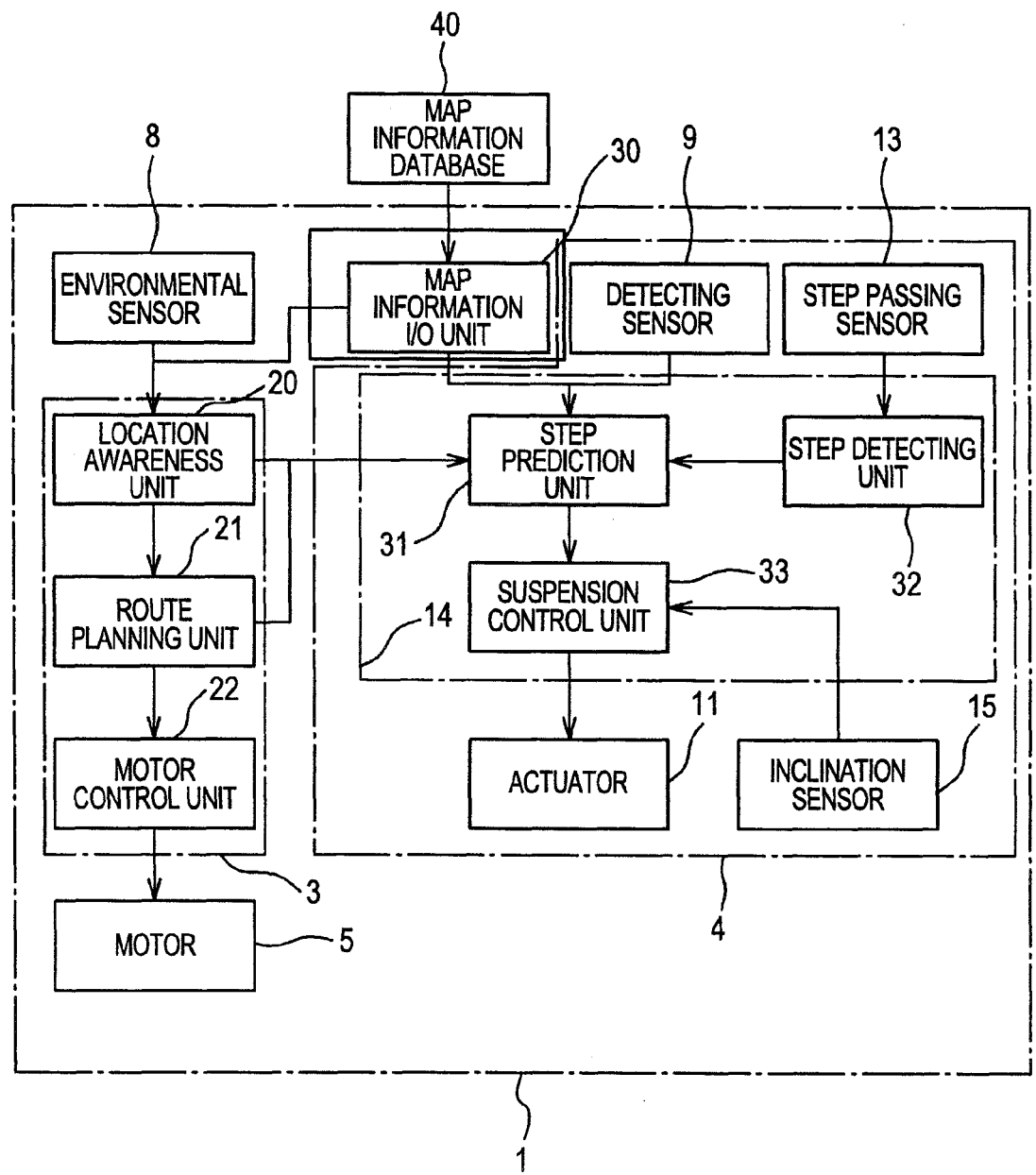
FIG. 4 is a block diagram showing the system configuration of the mobile robot according to the embodiment of the invention.

FIG. 4 is a block diagram showing the system configuration of the mobile robot according to the embodiment of the invention.

Note that the term "step" in this description of the embodiment includes steps in the negative direction, such as grooves and pits.

In FIG. 3A, a mobile unit 1 includes a travel mechanism 2, as enclosed by a dotted line, at the bottom of a main body (housing) 10 of the mobile unit 1. This travel mechanism 2 is controlled by a travel mechanism controller 3. At approximately the same height as the travel mechanism controller 3, an environmental sensor 8 is provided that measures the distance between the travel mechanism controller 3 and objects around the mobile unit 1. A stabilizer 4 enclosed by a dotted line is configured to stabilize the travelling motion of the main body 10.

FIG. 3B shows that the travel mechanism 2 is provided with driving wheels 6 on the opposite sides of the front part of the mobile unit 1. The travel mechanism 2 is made up with motors 5 whose operations are controlled by electrical signals from the travel mechanism controller 3 and the driving wheels 6 connected to the motors 5. In addition, the travel mechanism 2 is provided with a driven wheel 7 that is located at the center in a rear part of the mobile unit 1 and can passively change the direction.

A step detecting sensor 9 attached to the stabilizer 4 includes a laser scanner for detecting steps on a road surface. Actuators 11 change the distance between the driving wheels 6 and main body 10. Each of the actuators 11 and each of the driving wheels 6 are connected in series with a spring 12. Step passing sensors 13 measure the length of the springs 12. A stabilizing controller 14 and inclination sensor 15 are used to control the length of the actuators 11. The step detecting sensor 9, actuators 11, springs 12, step passing sensors 13, stabilizing controller 14, and inclination sensor 15 make up the stabilizer 4.

By referring to FIG. 4, the system configuration will be described.

In FIG. 4, the travel mechanism controller 3 connected with the environmental sensor 8, stabilizer 4 and motor 5 serves as a computing machine. The travel mechanism controller 3 includes a location awareness unit 20, route planning unit 21, motor control unit 22, which are implemented in software. The stabilizer 4 includes the actuator 11, step detecting sensor 9, step passing sensor 13, stabilizing controller 14 and inclination sensor 15.

The stabilizing controller 14 includes a step prediction unit 31, step detecting unit 32 and suspension control unit 33, which are implemented in software, and serves as a computing machine. The mobile unit 1 is connected to a map information database (DB) 40 that is placed outside the mobile unit 1. This map information database 40 is connected to the stabilizer 4 and travel mechanism controller 3 via a map information I/O unit 30 implemented in software in the mobile unit 1.

Processing and operations performed in the travel mechanism controller 3 will be described.

The location awareness unit 20 obtains distance information about the distance between the mobile unit 1 and surrounding objects from the environmental sensor 8 and map information from the map information I/O unit 30 at a constant frequency. Upon receipt of the map information, the location awareness unit 20 compares the obtained map information with the distance information about the distance between the mobile unit 1 and a surrounding object to calculate the present location of the mobile unit 1 on a map. An area of the map information is divided into grid segments each having a discrete field for storing a pass/fail flag, height, and step determination flag. Based on the present location on the map calculated at a constant frequency and a target destination stored in the route planning unit 21, the route planning unit 21 calculates a motor control target value used to move the mobile unit 1 to the target destination and sends the motor control target value to the motor control unit 22.

Figure 5:
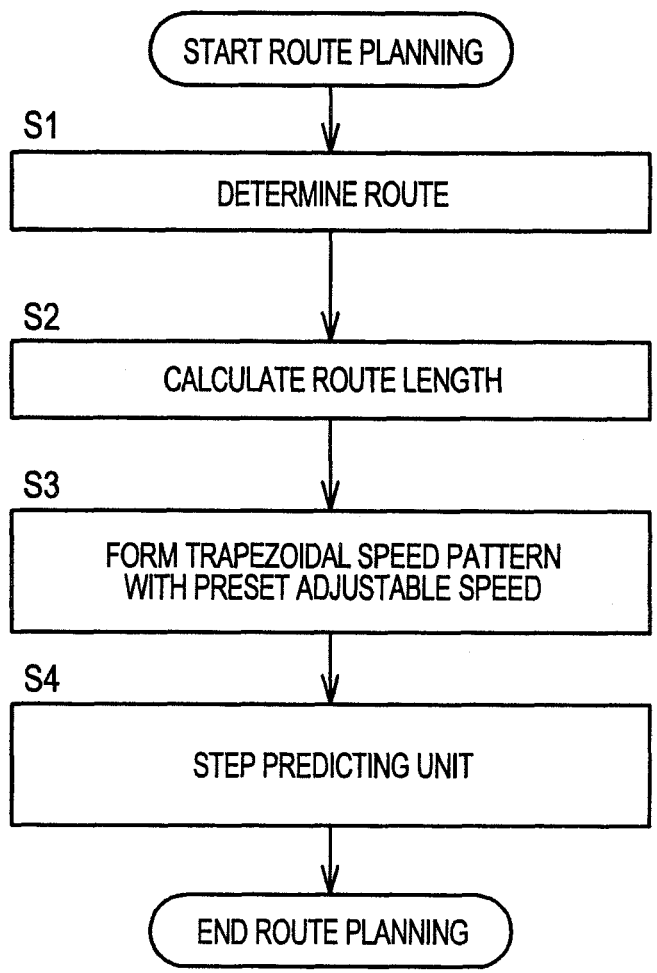
FIG. 5 is a flow chart illustrating route planning by the mobile robot.

The calculation of the route planning will be described with reference to the flow chart in FIG. 5.

At S1, the route planning unit 21 determines the route from the present location to the target value using an algorithm (route searching technique) such as A* (A-star).

At S2, the route planning unit 21 calculates the length of the route.

At S3, the route planning unit 21 uses preset adjustable speed and maximum speed to form a trapezoidal speed pattern in order to cover the entire route length obtained at S2.

At S4, the route planning unit 21 outputs motor control target values to the motor control unit 22 over time. The motor control unit 22 drives the motors 5 in response to the motor control target values.

A description will be made about the internal processing of the stabilizer 4. The processing of the stabilizer 4 includes three processes: step prediction; position control of the center of gravity of the mobile unit 1; and passed step detection.

Figure 6:
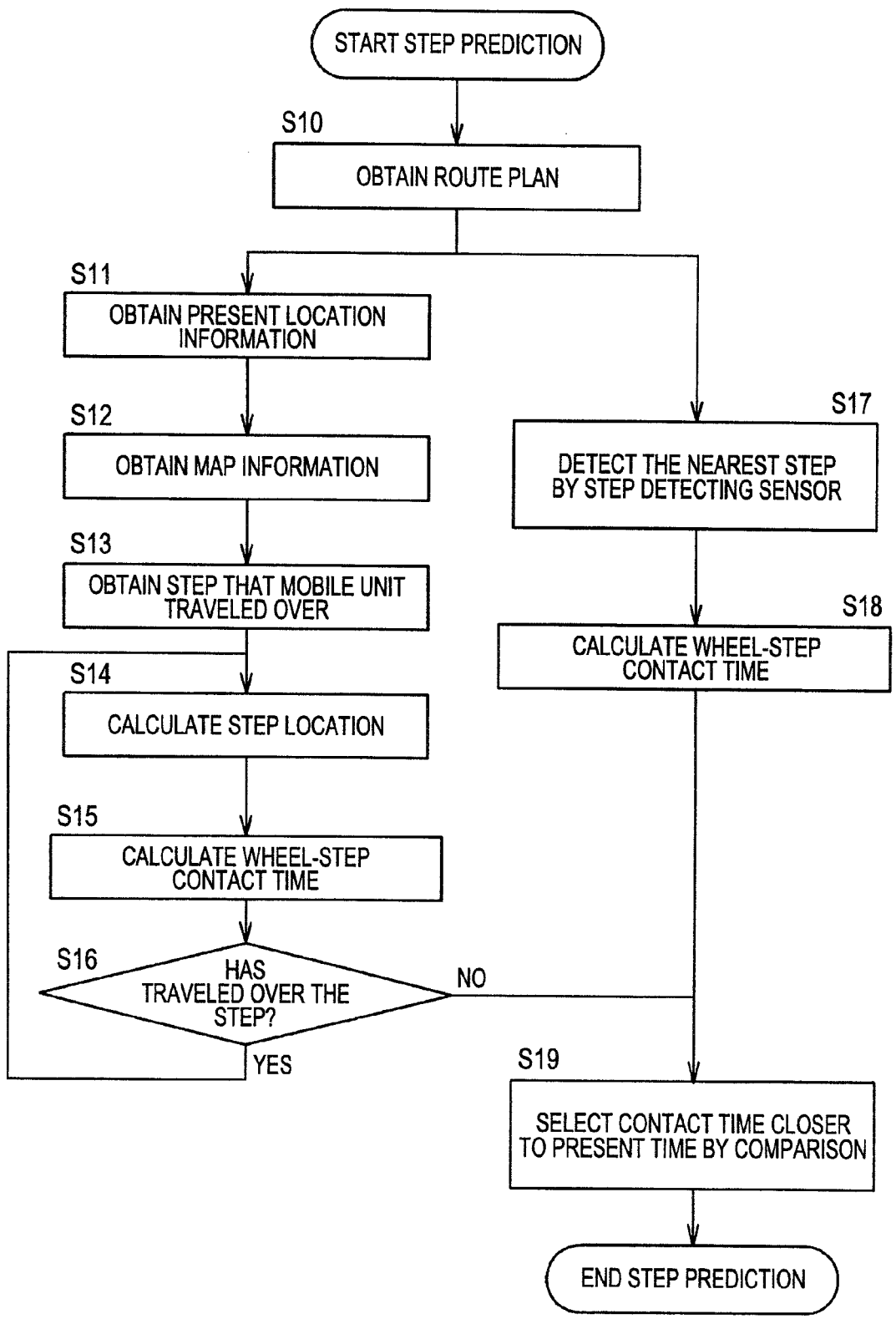
FIG. 6 is a flow chart illustrating step prediction by the mobile robot according to the embodiment of the invention.

First of all, step prediction will be described with reference to the flow chart in FIG. 6.

The step prediction process is executed at a preset constant frequency.

At S10, the step prediction unit 31 obtains the route and speed plan of the mobile unit 1 from the route planning unit 21.

Then, at S11, the step prediction unit 31 obtains present location information from the location awareness unit 20.

At S12, the step prediction unit 31 obtains map information from the map information I/O unit 30.

At S13, the step prediction unit 31 obtains the time at which the mobile unit 1 passed over the nearest step and the height of the step from the step detecting unit 32.

At S14, the step prediction unit 31 calculates the location of a step. More specifically, based on height data in the map information, the step prediction unit 31 extracts a grid segment in which the height of the road surface varies at a high rate, in the same manner as edge extraction used in image processing with a Sobel filter, Laplacian filter, Prewitt filter or the like to identify the location of the step.

At S15, the step prediction unit 31 calculates the times T1R and T1L, which are the times the right and left wheels make contact with the step, respectively. More specifically, the step prediction unit 31 compares the obtained route plan with the calculated step location and identifies the nearest step on the route for the respective right and left wheels. Then, the times at which the respective right and left wheels make contact with the step are calculated based on the obtained speed plan, resulting in step contact times T1R and T1L. The heights H1R and H1L of the step to make contact are estimated from the map information.

At S16, comparisons are made between the obtained information about the time at which the mobile unit 1 passed over the step and T1R and T1L and between the obtained height information about the step over which the mobile unit 1 passed and H1R and H1L. If the respective differences are equal to or less than a predetermined value, the step used for the calculation is regarded as the step that the mobile unit 1 has already passed over and the processing starts again from the calculation of the location of a step other than the step at S14.

On the other hand, at S17, the step prediction unit 31 receives an image from the step detecting sensor 9 and subjects the image to image processing to obtain 3D data in order to identify the location of a step.

At S18, the step prediction unit 31 calculates the times TR and TL at which the right and left wheels make contact with the step, respectively. More specifically, the step prediction unit 31 compares the obtained route plan with the calculated step location to identify the step on the route nearest to the right and left wheels.

Then, the times at which the right and left wheels make contact with the step are calculated based on the obtained speed plan to determine times T2R and T2L. In addition, the heights H2R and H2L of the step that the right and left wheels will next make contact with are derived from the image supplied from the step detecting sensor 9 through image processing.

At S19, the step prediction unit 31 makes comparisons between T1R and T2R and between T1L and T2L to select earlier contact times as TR and TL. The step prediction unit 31 also selects the step heights HR and HL corresponding to the selected TR and TL from the step heights H1R, H2R, H1L and H2L. Through the above-described processing, the step prediction unit 31 can predict when the right and left wheels make contact with the step and how high the step is.

Secondly, passed step detection will be described. The step detecting unit 32 is connected with the step passing sensor 13 and step prediction unit 31. The step detecting unit 32 filters information about the length of the spring 12 obtained from the step passing sensor 13 using a notch filter, and then differentiates the filtered information to obtain a value. If the obtained value is a certain value or more, it is determined that the wheel has passed over the step. The obtained value also provides information about the height of the step over which the wheel has passed.

With reference to the flow chart in FIG. 7, a description will be made about position control of the center of gravity of the mobile unit 1.

At S20, the suspension control unit 33 shown in FIG. 4 obtains, from the step prediction unit 31, the times TR and TL at which the right and left wheels make contact with a step and the heights HR and HL of the step.

At S21, the suspension control unit 33 calculates an amount of CG (center of gravity) shift A.

Figure 8:
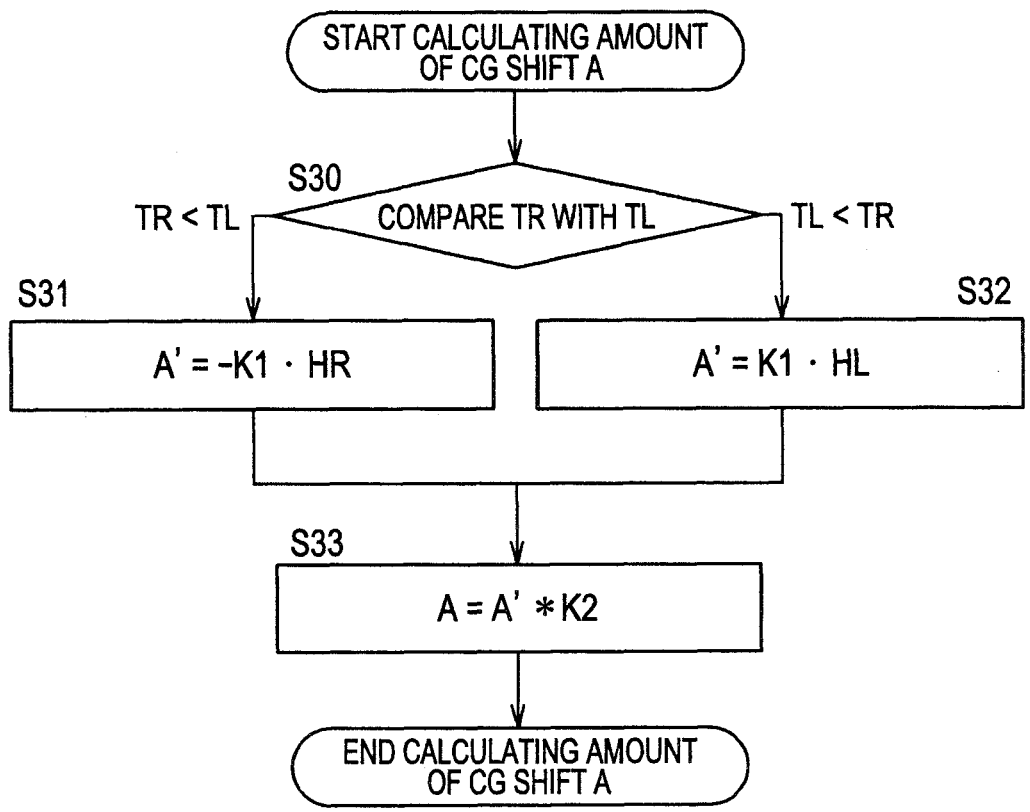
FIG. 8 is a flow chart illustrating calculation of an amount of CG shift A of the mobile robot according to the embodiment of the invention.

The specific calculation of the amount of CG shift A will be described with reference to the flow chart in FIG. 8.

At S30, the suspension control unit 33 compares TR with TL to determine which of TR or TL makes contact with the step first. If the right wheel makes contact with the step first (TR<TL), a provisional amount of CG shift A' is determined by Expression 1 at S31.

$$A'=-K1 \cdot HR \qquad \text{[Expression]}$$

If the left wheel makes contact with the step first (TL<TR), a provisional amount of CG shift A' is determined by Expression 2 at S32.

$$A'=K1 \cdot HL \qquad \text{[Expression]}$$

K1 in Expressions 1 and 2 denotes a positive value of scalar quantity. Based on two conditions: the moment produced by a driving wheel 6 passing over the step is proportional to the distance between the driving wheel 6 making contact with the step and the center of gravity of the mobile unit 1; and the mobile unit 1 has more resistance to impact from an unexpected step when the amount of CG shift is closer to 0, it is preferable to shift the center of gravity by only a necessary distance according to the predicted step.

At S33, an amount of CG shift A is determined by Expression 3.

$$A=A' \cdot K2 \qquad \text{[Expression 3]}$$

$$K2=F(TL-TR) \qquad \text{[Expression 4]}$$

K2 is a result of function F with TL−TR passed as an argument in Expression 4.

Figure 9:
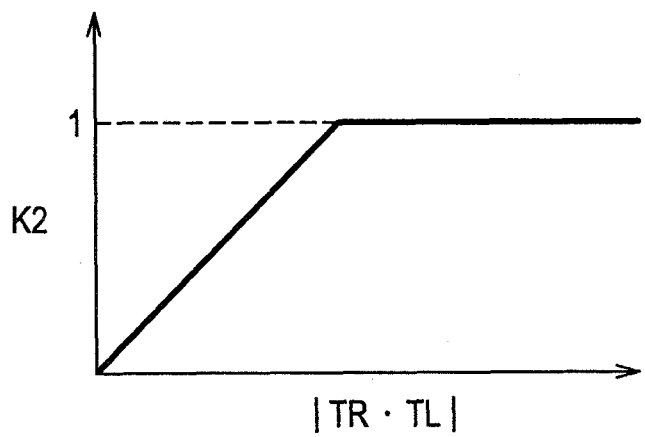
FIG. 9 depicts the form of function F used in the mobile robot according to the embodiment of the invention.

The form of function F is designed so that, as shown in FIG. 9, K2 starts from an origin point and increases in proportion with the absolute value of TL−TR, but is saturated in 1 when the absolute value of TL−TR reaches and exceeds a certain value. This is because there is no need to limit the amount of CG shift A when TL−TR is greater than the convergence time of lateral vibration in the mobile unit 1.

Through the above-described processing, the amount of CG shift A is determined.

Figure 7:
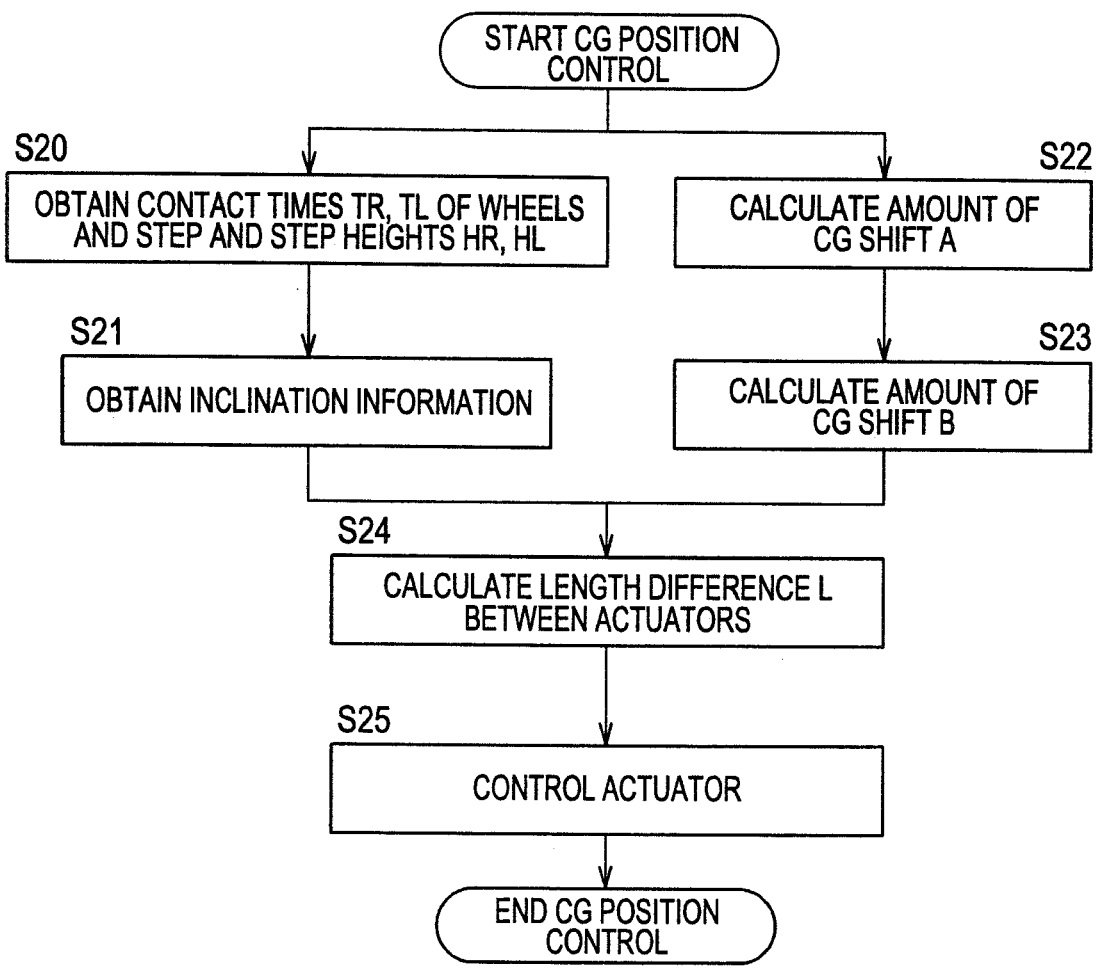
FIG. 7 is a flow chart illustrating position control of the center of gravity of the mobile robot according to the embodiment of the invention.

On the other hand, at S22 in FIG. 7, the suspension control unit 33 obtains an inclination angle θ about Y-axis and inclination angular velocity dθ about Y-axis of the mobile unit 1 from the inclination sensor 15. At S23, the suspension control unit 33 calculates an amount of CG shift B by Expression 5.

$$B=Q1 \cdot \theta + Q2 \cdot d\theta \qquad \text{[Expression 5]}$$

Q1 and Q2 denote scalar quantities, which have been previously designed. At S24, the suspension control unit 33 calculates the difference L in length between actuators used to shift the position of the center of gravity by Expression 6.

$$L = \frac{(A+B)W}{H} \qquad \text{[Expression 6]}$$

In Expression 6, W denotes the distance between the driving wheels 6 of the mobile unit 1, and H denotes the distance between the center of the driving wheels 6 and the center of gravity in the mobile unit 1 in direction Z.

At S25, the suspension control unit 33 controls the actuators 11 so that the actuators 11 have the difference L in length.

FIG. 10 is a graph showing simulation results to verify the effect of the embodiment.

FIG. 10 shows the results obtained when the center of gravity was shifted and when the center of gravity was not shifted. The graph indicates inclination angles θ, of the upper body, about Y-axis and travelling speed multiplied by 0.01.

The difference between execution and inexecution of CG shift is in whether the inclination angle θ about Y-axis is shifted toward the step with which the mobile unit 1 collides 1.1 seconds before the time the mobile unit 1 collides with the step.

The two graphs showing the results in the cases with and without CG shift exhibit that shifting the center of gravity in advance reduces the fluctuation of the angle θ at a peak by 12% when the mobile unit 1 passes over the step.

The embodiment of the present invention has been described above; however, the present invention is not limited to the embodiment and can be modified in various ways for reasons of the intended use and implementation.

For example, although the stabilizer 4 is provided with the map information I/O unit 30 as shown in FIG. 4, the stabilizer 4 can make step prediction using only the step detecting sensor 9. The step prediction also can be made using only the map information without use of the step detecting sensor 9. In addition, the map information database 40 is externally attached to the mobile unit 1, but can be built in the mobile unit 1.

Furthermore, the step passing sensors 13 are mounted to measure the length of the springs 12; however, whether the wheels have passed the step or not can be detected based on accelerations.

What is claimed is:

1. A mobile robot, including a plurality of wheels suspended from a main body of the mobile robot and configured to travel on a floor surface, a drive mechanism configured to rotate the wheels, and a drive controller configured to control the drive mechanism, comprising:
   actuators provided to adjust a distance between the mobile robot and the wheels thereof;
   a suspension control unit configured to control the actuators;
   a sensor configured to detect steps on the floor surface; and
   a step prediction unit configured to predict the time at which a step, including at least one of a bump and a pit, makes contact with the wheels, and to predict a speed of the mobile robot;
   wherein the suspension control unit is configured to control the actuators to shift a center of gravity of the mobile robot from the center of the mobile robot opposite to the direction in which the mobile robot inclines when the mobile robot passes over the step as a wheel of the mobile robot that makes contact with the step, then to shift the center of gravity of the mobile robot in the reverse direction then to shift the center of gravity of the mobile robot back to the center of the mobile robot after both wheels have passed over the step, and
   wherein the suspension control unit is configured to adjust an amount of shift of the center of gravity of the mobile robot according to an interval of time, as predicted by the step prediction unit, at which the wheel and the another wheel make contact with a bump or pit.

2. The mobile robot according to claim 1,
   wherein the height of, and direction to, the step are obtained from map information.

3. The mobile robot according to claim 1,
   wherein the suspension control unit controls actuators of wheels so that the actuators of a left wheel and a right wheel have a difference in length L;
   wherein the suspension control unit compares TR with TL, TL and TR denoting times at which the left wheel and the right wheel make contact with the step, respectively, to determine which of TR or TL is smaller, denoting which of the left wheel and the right wheel makes contact with the step first;

wherein if the right wheel makes contact with the step first, as denoted by the relationship (TR<TL), then a provisional value for an amount of shift of the center of gravity of the mobile robot A' is determined by the following formula:

$$A'=K1*HR;$$

wherein if the left wheel makes contact with the step first, as denoted by the relationship (TL<TR), then a provisional value for A' is determined by the following formula:

$$A'=K1*HL;$$

and wherein K1 denotes a positive value of a scalar quantity, HR denotes a step height corresponding to the selected TR, and HL denotes a step height corresponding to the selected TL.

4. A travelling method for a mobile robot including a step detecting sensor configured to detect a step including at least one of a bump and a pit, the method comprising:

detecting a direction to a step and a height of the step, obtained by the step detecting sensor;

measuring a distance between the step and the mobile robot; calculating a contact timing at which the mobile robot makes contact with the step, based on a target travelling speed;

shifting a center of gravity of the mobile robot from the center of the mobile robot opposite to the direction in which the mobile robot inclines when the mobile robot passes over the step as a wheel of the mobile robot that makes contact with the step, by controlling, with a suspension control unit, the actuators upon contact with the step;

shifting the center of gravity of the mobile robot in the reverse direction; and shifting the center of gravity of the mobile robot back to the center of the mobile robot after both wheels have passed over the step, wherein an amount of shift of the center of gravity of the mobile robot is performed according to a predicted time at which the wheel and the another wheel make contact with a bump or pit.

5. The travelling method according to claim 4, wherein the height of, and direction to, the step are obtained from map information.

6. The travelling method according to claim 4, wherein actuators of wheels are controlled by the suspension control unit so that the actuators of a left wheel and a right wheel have a difference in length L;

wherein TR with TL are compared by the suspension control unit, TL and TR denoting times at which the left wheel and the right wheel make contact with the step, respectively, to determine which of TR or TL is smaller, denoting which of the left wheel and the right wheel makes contact with the step first;

wherein if the right wheel makes contact with the step first, as denoted by the relationship (TR<TL), then a provisional value for an amount of shift of the center of gravity of the mobile robot A' is determined by the following formula:

$$A'=K1*HR;$$

wherein if the left wheel makes contact with the step first, as denoted by the relationship (TL<TR), then a provisional value for A' is determined by the following formula:

$$A'=K1*HL;$$

and wherein K1 denotes a positive value of a scalar quantity, HR denotes a step height corresponding to the selected TR, and HL denotes a step height corresponding to the selected TL.

* * * * *